United States Patent
Baneck et al.

(10) Patent No.: US 6,619,468 B1
(45) Date of Patent: Sep. 16, 2003

(54) SAFETY SWITCH FOR OVERHEAD CONVEYOR TRACK

(75) Inventors: Jeffrey S. Baneck, Watertown, WI (US); Brian R. Krause, Helenville, WI (US)

(73) Assignee: Doskocil Food Service Company - Jefferson, L.P., Jefferson, WI (US)

( * ) Notice: Subject to any disclaimer, the term of this patent is extended or adjusted under 35 U.S.C. 154(b) by 0 days.

(21) Appl. No.: 10/241,056

(22) Filed: Sep. 11, 2002

(51) Int. Cl.[7] .............................................. B65G 29/00
(52) U.S. Cl. ................................ 198/465.4; 198/687.1; 104/89
(58) Field of Search ........................... 198/465.1, 465.4, 198/678.1, 687.1, 592, 632; 104/89

(56) References Cited

U.S. PATENT DOCUMENTS

| | | | | |
|---|---|---|---|---|
| 3,876,060 A | * | 4/1975 | Stease ......................... | 198/109 |
| 4,026,424 A | * | 5/1977 | Fiorentino ................... | 104/88 |
| 4,276,995 A | * | 7/1981 | Jennewein .................. | 198/473 |
| 5,072,822 A | * | 12/1991 | Smith ......................... | 198/349 |
| 5,078,255 A | * | 1/1992 | Haley ......................... | 198/369 |
| 5,238,116 A | * | 8/1993 | Santicchi .................... | 198/465.4 |
| 5,453,045 A | * | 9/1995 | Hobbel et al. .............. | 452/183 |
| 6,409,011 B1 | * | 6/2002 | Ferguson .................... | 198/861.3 |
| 6,439,366 B1 | * | 8/2002 | Matkovich .................. | 198/464.4 |

FOREIGN PATENT DOCUMENTS

| | | | | |
|---|---|---|---|---|
| JP | 4-28605 | * | 5/1990 | .............. 198/465.4 |
| JP | 4-28606 | * | 5/1990 | .............. 198/465.4 |

* cited by examiner

Primary Examiner—Douglas Hess
(74) Attorney, Agent, or Firm—Shook, Hardy & Bacon L.L.P.

(57) ABSTRACT

An overhead conveyor track system for a wheeled carrier having at least one wheel adapted for traveling along a track and a depending load bracket. The system includes first and second elongated conveyor tracks having respective free ends. These tracks are adapted and arranged such that the same are in substantial longitudinal alignment with the free ends thereof in spaced relationship presenting a gap therebetween. The system further includes an elongated track segment that is adapted and arranged so as to be placed in the gap in a gap closed position in substantial longitudinal alignment with the tracks. The track segment normally is in the gap in its gap closed position but is removable from the gap so as to provide the system with a gap open condition. An automatic safety switch mechanism is provided. This switch includes at least one moveable track blocking element that is operably coupled with the segment when the latter is in its gap closed position, and the same is effective when the segment is removed from the gap and the system is therefore in its gap open condition, to block at least one of the free ends of the tracks to prevent movement of a carrier toward the gap. Ideally, the automatic safety switch mechanism may include two moveable track blocking elements whereby both of the free ends are blocked when the system is in its gap open condition.

27 Claims, 3 Drawing Sheets

SAFETY SWITCH FOR OVERHEAD CONVEYOR TRACK

BACKGROUND OF THE INVENTION

1. The Field of the Invention

The present invention relates to the field of conveyors for moving products and materials between locations in manufacturing, storage and/or shipping facilities and in particular relates to safety devices for conveyors consisting of an overhead track and a wheeled carrier. Even more particularly, the invention relates to a safety switch which permits opening of the track to provide a gap between spaced ends of the track and prevent the movement of the carrier toward the gap and off of the track while the track is open.

2. The State of the Prior Art

Overhead conveyors systems consisting of an overhead track and wheeled carriages which ride on the track for moving products and materials between locations in manufacturing, storage and/or shipping facilities are well known. A problem exists in such systems because the overhead track is sometimes in a position to interfere with other operations. In certain instances, such a track may be in a location where it interferes with the operation of another transversely extending overhead track. In other instances, such as when the load needs to be moved from one level of a facility to another on an elevator, the track might interfere with the proper operation of the elevator.

To eliminate these interferences, it has been known to provide a switch consisting of a short segment of track which is removable at the point where the interference might otherwise occur. Often, the short segment of track is simply swingably mounted on the end of one of the tracks adjacent the gap, and some sort of a support is provided on the track on the opposite side of the gap from the place where the short segment is swingably mounted. To open the track and provide a gap which avoids the undesirable interference, the free end of the short segment may be manually lifted from the support and allowed to swing downwardly into a hanging or depending position. After there is no longer a need for the switch to be open, the free end of the short segment is simply lifted back up and positioned on the support to once again provide a continuous track.

A major problem with an arrangement such as that described above is that a carriage on the free end of the track adjacent the gap might accidently be caused to move toward the gap and fall. This of course is quite dangerous because the loads on the carriages are heavy and falling would create a hazardous situation not only for the load itself but also for objects and persons below.

SUMMARY OF THE INVENTION

In accordance with the broadest concepts and principles of the invention, the same provides solutions for and/or relief from the prior art problems discussed above. In particular, the invention provides means for preventing carriages from moving toward a gap in a track when the track is in an open condition. Thus, the invention provides an overhead conveyor track system for a wheeled carrier having at least one wheel adapted for traveling along a track and a depending load bracket. The system includes first and second elongated conveyor tracks having respective free ends. These tracks are adapted and arranged such that the same are in substantial longitudinal alignment with the free ends thereof in spaced relationship presenting a gap therebetween. The system further includes an elongated track segment that is adapted and arranged so as to be placed in the gap in a gap closed position in substantial longitudinal alignment with the tracks. The track segment normally is in the gap in its gap closed position, but is removable from the gap so as to provide the system with a gap open condition. In accordance with the principles and concepts of the invention, the system further comprises an automatic safety switch mechanism which includes at least one moveable track blocking element that is operably coupled with the segment when the latter is in its gap closed position, and which is effective, when the segment is removed from the gap and the system is therefore in its gap open condition, to block at least one of the free ends of the tracks to prevent movement of a carrier toward the gap. Ideally, the automatic safety switch mechanism may include two moveable track blocking elements whereby both of the free ends are blocked when the system is in its gap open condition.

In further accordance with the concepts and principles of the invention, the elongated track segment may have spaced ends, one of which is may be moveably attached to the free end of the first track for movement between a gap closed position and a gap open position. Desirably, the segment may be pivotally attached to the free end of the first track for swinging between its positions about a horizontal axis. In this form of the invention, the safety switch mechanism may be effective when the segment is in its gap open position to block the free end of the second track to prevent movement of a carrier on the second track toward the gap. In one preferred form of the invention, the system may include at least one overhead support assemblage for the second track and at least a portion of the safety switch mechanism may be carried by the support assemblage. Desirably, the support assemblage may be attached to an upper structure of an elevator.

Alternatively, or additionally, the system may include a track blocking member at the end of the segment which is attached to the first track and which is effective when the segment is in its gap open position to block the free end of the first track to prevent movement of a carrier on the first track toward the gap.

In a preferred form of the invention, the safety switch mechanism may be mounted adjacent the free end of the second track and may include a track blocking and unblocking element comprising an elongated arm that is moveable between track blocking and track clearing positions. Desirably, the arm may be operable in its track blocking position to prevent the movement of a carrier on the second track toward the gap. In this form of the invention, the safety switch mechanism may desirably include a latching member that is operably connected to and moves with the arm. The system may further include a latch element operably associated with the track segment and disposed, when the track segment is in its gap closed position, to contact the latching member and thereby prevent movement of the arm to its track blocking position. Ideally, the safety switch mechanism may include a biasing element, that may be in the form of a counterweight or a coil spring that is operably connected to the arm to urge the latter toward its rail blocking position. In one preferred form of the invention, the track blocking and unblocking element may be pivotally mounted for swinging about a horizontal axis to move the arm between its blocking and clearing positions.

Ideally, the safety switch mechanism may include an elongated appendage that is operably connected to the track blocking and unblocking element so that the arm and the appendage move in unison. Desirably, the latching member (portion) is positioned at a free end of the appendage and the same is positioned for contacting the latch element such that the contact between the latch element and the latching portion prevents movement of the elongated appendage and thereby movement of the arm to its track blocking position.

Alternatively, or additionally, the system may include a track blocking member at the end of the segment that is attached to the first track and which includes an extension element located so as to block the free end of the first track when the segment is in its gap open position to prevent movement of a carrier on the first track toward the gap. Desirably, the extension element comprises at least one leg mounted adjacent the end of the track segment so as to swing into a position alongside the first track when the track element swings into its gap open position.

In accordance with the principles and concepts of the invention, the invention provides a composite assemblage of components presenting an overhead conveyor track system for a wheeled carrier having at least one wheel adapted for traveling along a track and a depending load bracket. Desirably, the system may include a first elongated conveyor track having a free end, and a second elongated conveyor track having a free end. The tracks may desirably be adapted for arrangement in substantial longitudinal alignment and with the free ends thereof in spaced relationship presenting a gap therebetween. The overall system includes an elongated track segment having spaced first and second ends and which is adapted for being positioned in the gap in substantial longitudinal alignment with the tracks. Ideally, the first end of the segment is rotatably attached to the free end of the first track for swinging movement between a horizontal gap closed position and a gap open position where the track segment depends vertically from the free end of the first track.

Preferably, the system may include a receptacle mounted at the free end of the second track for releasably supporting the second end of the track segment when the track segment is in its gap closed position and prevent it from swinging downwardly into its gap open position. The system may also preferably include an automatic safety switch mechanism that is mounted adjacent the free end of the second track. The safety switch mechanism desirably includes a track blocking and unblocking element, an elongated rocker element and an elongated pivoting beam structure.

The track blocking and unblocking element may be mounted for rotation about a horizontal axis that extends transversely therethrough, and the same may include an elongated arm that is moveable between track blocking and track clearing positions when the track blocking and unblocking element swings about the horizontal axis. The arm is operable in its track blocking position to prevent movement of a carrier on the second track toward the gap.

The rocker element may desirably have a pair of spaced ends, and the same may be rotatable about a horizontal axis that extends transversely therethrough between the spaced ends thereof and which is essentially perpendicular to the axis of rotation of the track blocking and unblocking element.

The beam structure may also have a pair of spaced ends, and this component also may be mounted so as to pivot about a horizontal axis that extends transversely therethrough between its spaced ends. The pivot axis of the beam structure desirably is essentially parallel to the axis of rotation of the rocker element. Ideally, the beam structure may include a laterally extending appendage that extends toward the second end of the track segment when the track segment is in its gap closed position in essential parallelism relative to the axis of the pivoting beam structure. The appendage desirably has a latching portion at its free end that is disposed in proximity to the second end of the track segment when the track segment is in its gap closed position.

In accordance with the concepts and principles of the invention, the track blocking and unblocking element, the rocker element and the beam structure may desirably be linked together so as to pivot about their respective axes in unison in response to the urging of a counterweight or a spring element that is connected to at least one of the track blocking and unblocking element, the rocker element and the beam structure in a position to urge the arm toward its track blocking position.

In further accordance with the concepts and principles of the invention, the system includes a latch element comprising a latch plate extending laterally from the track segment at a location adjacent the second end thereof. Desirably, the latch element is in a position, when the track segment is in its gap closed position, to contact the latching portion at the free end of the appendage and prevent the appendage and thereby the beam structure, the rocker element, and the track blocking and unblocking element from moving under the influence of the biasing element when the track segment is in its gap closed position. Thus, the arm is prevented from moving to its track blocking position when the latch element and the latching member are engaged.

Finally, in its composite form, the system provides a track blocking member at the first end of the track segment including an extension element located to block the free end of the first track when the segment is in its gap open position to thereby prevent movement of a carrier on the first track toward the gap. Ideally, the track blocking member may comprise a leg mounted at the first end of the track segment which extends outwardly away from the first end in a direction essentially parallel to the track segment so as to swing upwardly into a first track blocking position alongside the first track when the track element swings downwardly into its gap open position.

Preferably, the system includes at least one overhead support assemblage for the first track and at least one overhead support assemblage for the second track, and the safety switch mechanism is desirably carried by the support assemblage for the second track. In one preferred form of the invention, the support assemblage for the second track may be attached to an upper structure of an elevator.

BRIEF DESCRIPTION OF THE DRAWINGS

In the accompanying drawings, which form part of the specification and are to be read in conjunction therewith, and in which like reference numerals are used to indicate like parts in the various views.

DESCRIPTION OF THE PREFERRED EMBODIMENT

Figure 1:
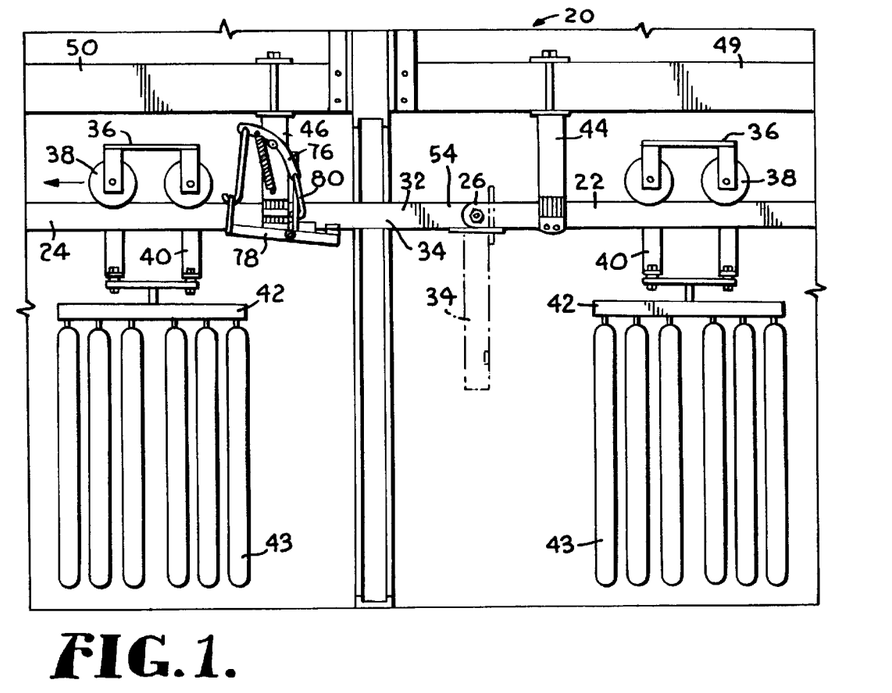
FIG. 1 is a side elevational view of an overhead conveyor system which embodies the concepts and principles of the invention.

An overhead conveyor track system which embodies the principles and concepts of the invention is illustrated in FIG. 1 where it is identified by the reference numeral 20. As illustrated in FIG. 1, the track system 20 includes a first length of track 22 and a second length of track 24, which lengths of track 22 and 24 are arranged in substantial longitudinal alignment with the respective free ends 26 and 28 thereof in spaced relationship so that a gap 30 (see FIG. 5) is presented therebetween. As shown in solid lines in FIG. 1, an elongated, but relatively shorter segment of track 32 is positioned in the gap 30 between the free ends 26, 28 so as to provide a normally continuous track 34 along which a series of wheeled carriers 36 may be moved from place to place in a known manner. The carriers 36, which are conventional, each have one or more wheels 38 which travel along the track 34, and each has a depending load carrying bracket 40. Brackets 40 are designed to support racks 42 or the like which are adapted to carry products and/or materials such that the carriers 36 are able to move various products and/or materials between various locations in manufacturing, storage and/or shipping facilities. As shown in FIG. 1, the support racks 42 are loaded with sausage-like food products 43; however, it is contemplated in accordance with the concepts and principles of the invention that the system 20 has universally applicability and is in no way limited to use with any specific product or material.

Figures 3, 4:
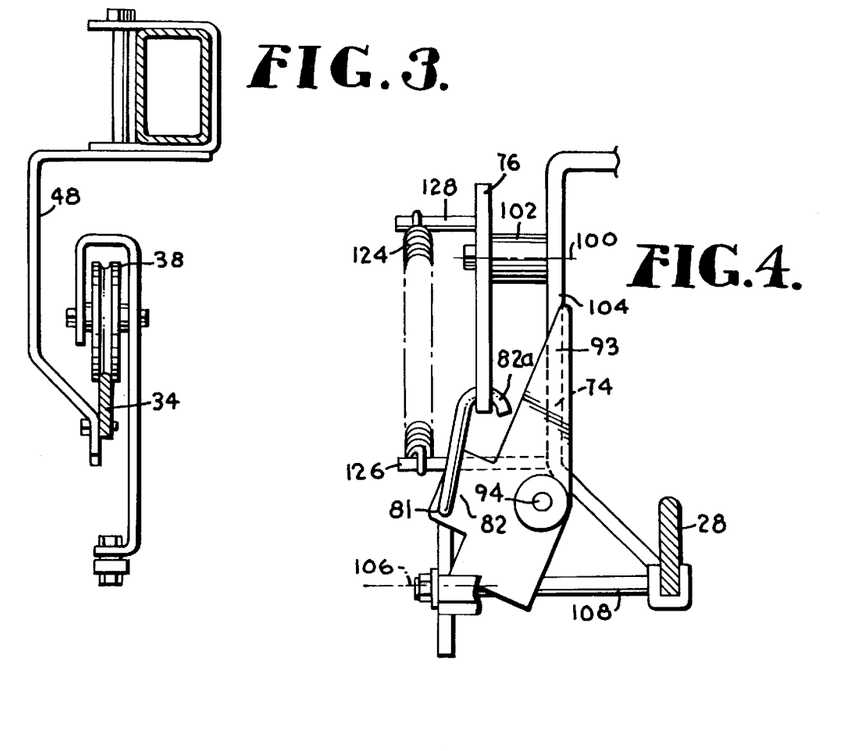
FIG. 3 is a cross-sectional view taken essentially along the line 3—3 of FIG. 2.
FIG. 4 is a cross-sectional view taken essentially along the line 4—4 of FIG. 2.

With reference to FIGS. 1 and 3, it can be seen that the lengths of track 22, 24 are supported in a convention manner by respective overhead support assemblages 44, 46, which may all be essentially the same. As can be seen particularly in FIG. 3, the assemblages 44, 46 include respective hanger elements 48 which are shaped to provide room for the wheels 38 as they move along the track 34. The assemblages 44, 46 may generally be attached to the supporting beams or rafters 49 of the building in which they are installed. However, in the case of the specific preferred embodiment shown in the drawings, the assemblage 46 is attached to the upper structure 50 of an elevator 52.

Figure 5:
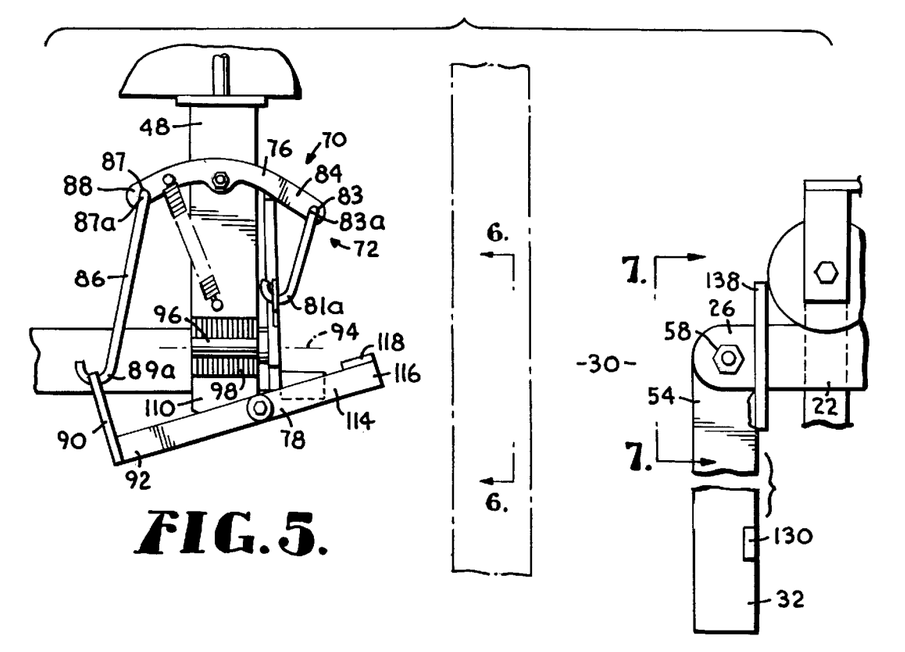
FIG. 5 is an enlarged view similar to FIG. 2 except that the safety switch is shown in its open position.

As can be seen in FIGS. 1, 2 , 4 and 7, end 54 of track segment 32 is pivotally attached to the free end 26 of track 22 for swinging movement about a generally horizontal axis 56 defined by pivot structure 58. To facilitate this swinging movement of track segment 32 relative to track 22, both the free end 26 of the latter and the end 54 of track 22 may desirably be relieved as shown particularly in FIG. 7, to thereby present mated depressions 60, 62 which allow the track 22 and the segment 32 to remain essentially in the same plane while the same swing relative to each other. Thus, segment 32 is free to swing relative to end 26 of track 22 about axis 56 between a generally horizontal gap closed position as shown in FIG. 4 and a gap open position as shown in FIG. 5 where the segment 32 simply hangs essentially vertically from pivot structure 58 at the end 26 of track 22. With reference to FIG. 1, the track segment 32 is shown in its gap closed position in solid lines and in its gap open position in phantom lines.

Figure 2:
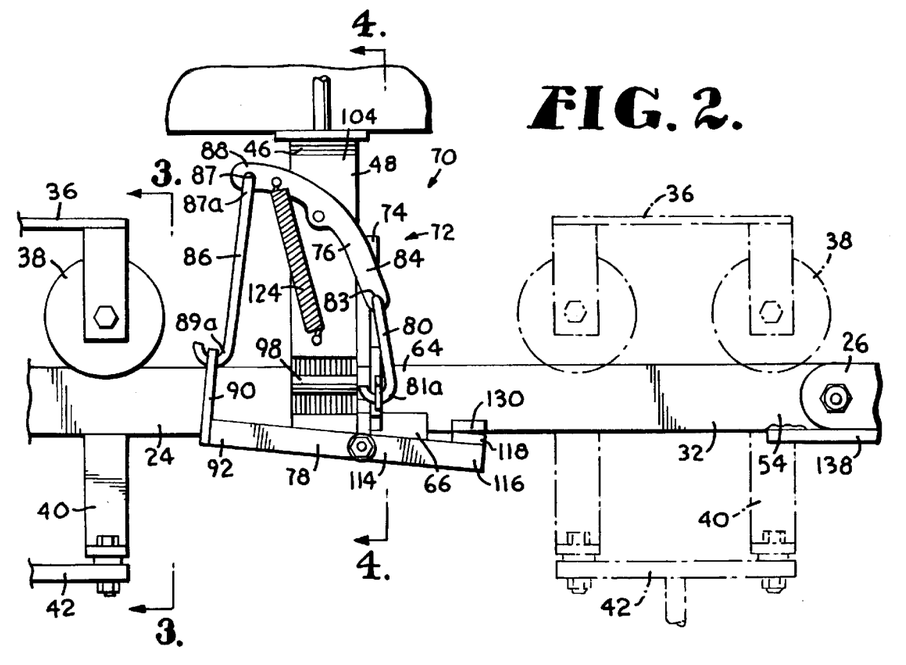
FIG. 2 is an enlarged elevational view illustrating a safety switch which is part of the system of FIG. 1 and which further embodies the concepts and principles of the invention.

When track segment 32 is in its gap closed position as shown in FIG. 2, the end 64 thereof, which is adjacent free end 28 of track 24, is releasably supported by a receptacle 66 in the nature of a cradle having a U-shaped cross-sectional configuration which is attached by welding or the like to free end 28. Receptacle 66 normally prevents segment 32 from swinging downwardly from its gap closing position. When the need arises for the segment 32 assume its gap open position, the end 64 is simply lifted and moved sideways until it clears the upright side wall 68 of the receptacle, and then the segment 32 will be free to swing downwardly into its gap open position as shown in FIG. 5. Needless to say, to facilitate this operation, the segment 32 and the pivot structure 58 must be sufficiently flexible to permit the segment to clear. the side wall 68. This operation is illustrated schematically in FIG. 8, where the side wall clearing position of the segment 32 is shown in phantom lines.

As explained above, from time-to-time the segment 32 must be placed into its gap open position so that a carrier on a transverse track may pass by or so that a portion of a track on an elevator can be disconnected so as to allow the elevator to move vertically. In the past, this has created a hazardous situation. To alleviate and perhaps eliminate the hazard completely, the system 20 of the present invention includes an automatic safety switch mechanism 70 that is effective when the segment 32 is removed from its gap closed position and the system 20 is in its gap open condition, to block the free ends of the tracks 22, 24 and prevent movement of the carrier 36 toward gap 30.

Mechanism 70 includes a safety switch assembly 72 which is effective to block the free end 28 of track 24 when segment 32 is in its gap open position and thereby prevent movement of a carrier 36 on track 24 towards gap 30. As can be seen viewing FIGS. 2, 4, 5 and 6, assembly 72 is mounted on the hanger element 48 of overhead support assemblage 46. Assembly 72 includes a track blocking and unblocking element 74, an elongated rocker element 76 and a pivoting beam structure 78. Assembly 72 also includes a linking rod 80 interconnecting a hole 81 in tab 82 on element 74 with a similar hole 83 at one end 84 of rocker element 76, and another linking rod 86 interconnecting a hole 87 at the other end 88 of rocker element 76 with a hole 89 in plate 90 mounted at end 92 of beam structure 78. For purposes of the foregoing, the rods 80 and 86 may be provided with appropriate hooks 81a, 83a, 87a and 89a, which are received within the respective holes 81, 83, 87 and 89, as shown.

Track blocking and unblocking element 74, which includes an elongated arm 93, is pivotally mounted for rotation about a generally horizontal axis 94 defined by pivot structure in the form of a boss 96 mounted by welding or the like on angled surface 98 of the hanger element 48 of support assemblage 46. As can be seen in the drawings, axis 94 extends transversely through the element 74 at a point which is between arm 93 and hole 81 in tab 82. As element 74 swings about the axis 94 provided by the pivot structure 96, arm 93 of element 74 is moved between (1) a track blocking position illustrated in FIG. 6 where the arm 93 is in a position to prevent a carrier 36 on track 24 from moving toward the gap 30, and (2) a track clearing position illustrated in FIG. 4, where a carrier 36 on track 24 is free to move toward the gap 30.

Figure 6:
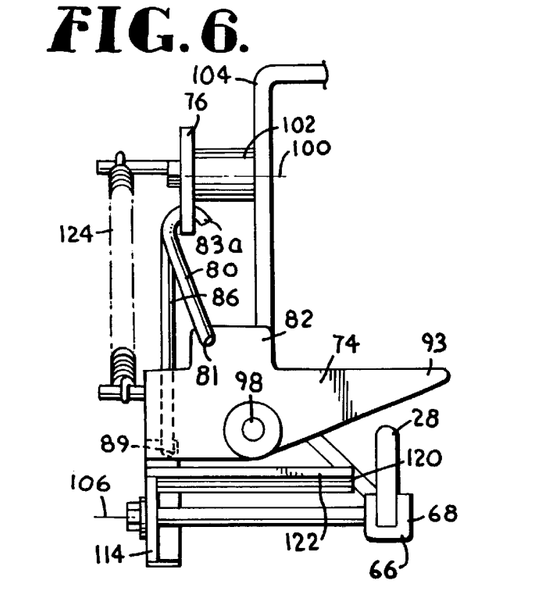
FIG. 6 is a cross-sectional view taken essentially along the line 6—6 of FIG. 5.

With reference to FIGS. 4, 5 and 6, it can be seen that rocker element 76 is pivotally mounted for rotation about a generally horizontal axis 100 defined by pivot structure in the form of a boss 102 that is mounted by welding or the like on horizontal surface 104 of the hanger element 48 of support assemblage 46. As can be seen in the drawings, axis 100 extends transversely through the element 76 at a point which is between ends 84 and 88 thereof. Axis 100 extends in a direction which is essentially perpendicular relative to axis 94.

Beam structure 78 is pivotally mounted for rotation about a generally horizontal axis 106 defined by pivot structure in the form of a bar 108 that is mounted by welding or the like on a horizontal surface 110 at the lower end 112 of the hanger element 48. As can be seen in the drawings, axis 106 extends transversely through an elongated beam element 114 of the structure 78 at a point which is between ends 92 and 116 thereof. Axis 106 extends in a direction which is essentially parallel to axis 100. Beam structure 78 also includes an elongated appendage 118 that extends laterally away from end 116 of beam element 114 in a direction which is generally parallel to axis 106 such that its distal end 120 (see FIG. 9) is in the proximity of free end 28 of track 24. The portion 122 of the appendage 118 adjacent the distal end 120 provides a latching member for a purpose to be described hereinafter.

As can be seen from the various figures of the drawings, and with reference to the foregoing description of the various parts of the switch assembly 72, the operation of the latter is such that the track blocking and unblocking element 74, the elongated rocker element 76 and the pivoting beam structure 78 all pivot in unison. Thus, when the arm 93 moves toward its track blocking position illustrated in FIG. 6, the latching member portion 122 of appendage 118 moves upwardly, and when the arm 93 moves toward its track clearing position illustrated in FIG. 4, the latching member portion 122 of appendage 118 moves downwardly. Hence, the arrangement is such that the arm 93 and the portion 122 always move in unison.

Assembly 72 is provided with a biasing element in the form of a coiled tension spring 124 that is attached between a hanger rod 126 attached by welding or the like to horizontal surface 104 and a hanger rod 128 attached by welding or the like to rocker element 76. Hanger rod 128 is positioned between axis 100 and end 88 such that the rocker element 76 is urged by spring 124 to rotate in a counter-clockwise direction (FIGS. 2 and 5) about axis 100. Since rocker element 76 is urged to rotate in a counterclockwise direction and the components of assembly 72 are all interconnected for rotation in unison, arm 93 is urged under the influence of spring 124 to rotate toward its track blocking position illustrated in FIG. 6. In addition, appendage 118 is urged to move upwardly under the influence of spring 124. It is to be noted in the foregoing regard, the exact connection between the spring 124 and the rest of the components is not a critical feature of the invention. Suffice it to say that spring 124 simply needs to be attached in a manner to urge arm 93 toward its track blocking position. Alternatively, it may be preferred to eliminate the spring 124 because of the possibility that it may stretch, break or become disengaged. A counterweight may be added, such as to the end 92 of the beam structure 78, to supply the desired biasing force in place of the spring 124. The counterweight should be of a sufficient mass to cause the beam structure 78 to be urged to rotate in a counterclockwise direction (as viewed in FIGS. 2 and 5) to thereby urge the rocker element 76 to rotate in the same counterclockwise direction. It will be appreciated that the exact location of the counterweight is unimportant so long as the desired rotational biasing force is transmitted to the rocker element 76. The counterweight also need not be a separate element, but can be formed as an integral part of the beam structure 78, plate 90 or linkage rod 86.

Figure 8:
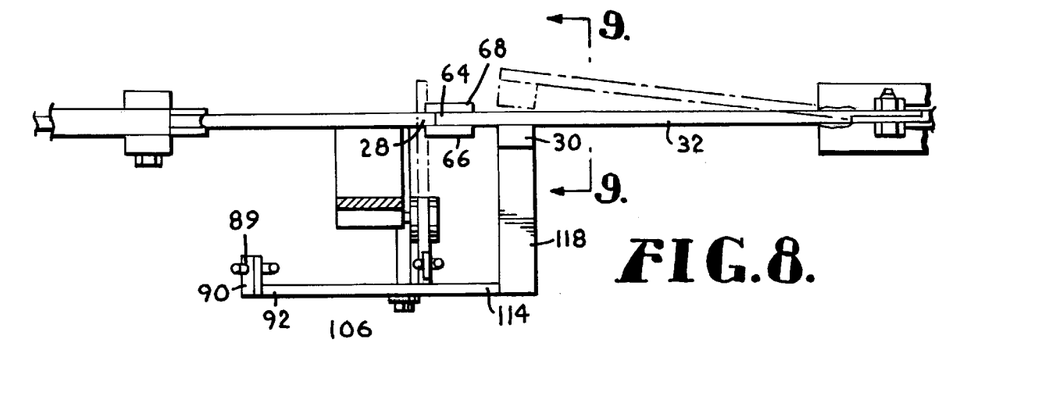
FIG. 8 is a top plan view of the portion of the conveyor system illustrated in FIG. 2.
Figure 9:
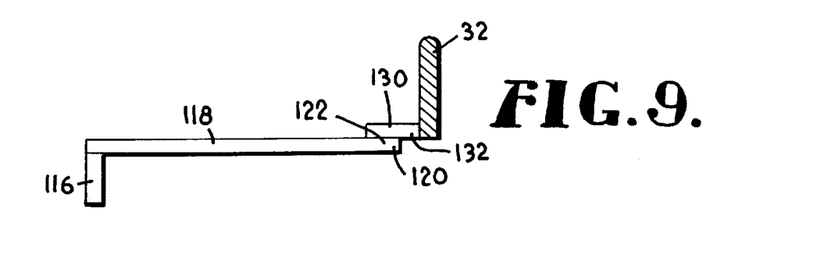
FIG. 9 is a cross-sectional view taken essentially along the line 9—9 of FIG. 8.

A small plate 130 is attached to track segment 32 as can be seen particularly in FIGS. 8 and 9. Plate 130 provides a latch element 132 which extends laterally away from track segment 32 in a direction toward latching portion 122. Latch element 132 is disposed on segment 32 such that when the latter is in its gap closed position and arm 93 is in its track clearing position, element 132 is positioned directly above latching portion 122 (see FIG. 9) so that the latter comes into contact with the element 132 when appendage 118 is urged upwardly under the influence of the counterweight or spring 124. Thus, appendage 118 is prevented from moving upwardly whereby arm 93 is held in its track clearing position so long as latching portion 122 is prevented from moving upwardly by contact with latch element 132. Accordingly, the latch element 132 is operably associated with the track segment 32 such that when the latter is in its gap closed position, the latch element 132 prevents movement of the arm 93 toward its track blocking position shown in FIG. 6. In an alternative embodiment which may be preferred in certain applications, the plate 130 and latch element 132 may be omitted and the appendage 118 is increased in length so that the latching portion 122 is in vertical alignment with and contacts the track segment 32 when the latter is in its gap closed position. The track segment 32 thereby prevents upward movement of the appendage 118 until the track segment 32 is moved to its gap open position.

Figure 7:
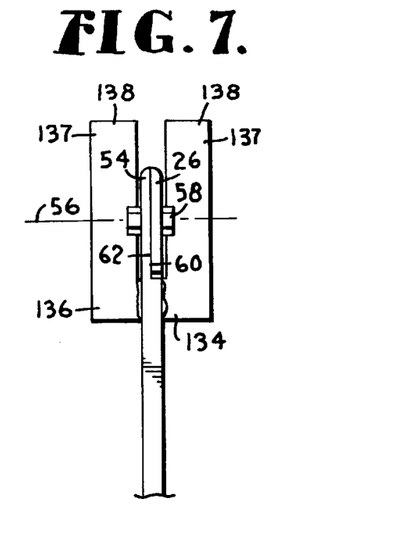
FIG. 7 is a cross-sectional view taken essentially along the line 7—7 of FIG. 5.

As can best be seen in FIG. 7, which illustrates track segment 32 in its gap open position where it hangs downwardly from pivot structure 58, the bight 134 of a generally U-shaped plate 136 is attached to the underside of the end 54 of track segment 32 by welding or the like. Plate 136 includes a pair of extension elements 137 in the form of spaced legs 138 which are mounted adjacent end 54 and extend longitudinally outwardly therefrom along the major axis of track segment 32. As shown in FIG. 7, the legs 138 extend upwardly from track segment 32 into a position to block the free end 26 of track 22 and prevent a carrier 36 from moving along track 22 toward gap 30 when the track segment 32 is in its gap open position. When track segment 32 is in its gap closed position, as shown in FIG. 2, the legs 138 are positioned beneath track 22 and are out of the path of travel of the carrier 36 along track 34. However, when track segment 32 swings downwardly to assume its gap open position as illustrated in FIG. 5, the legs 138 swing upwardly into their track blocking position alongside the upper edge of the track 22. Thus, the legs 138 provide track blocking members that are effective when the track segment 32 is in its gap open position to block the free end 26 of the track 22 and prevent movement of a carrier 36 toward gap 30.

What is claimed is:

1. An overhead conveyor track system for a wheeled carrier having at least one wheel adapted for traveling along a track and a depending load bracket, said system comprising:

a first elongated conveyor track having a free end;

a second elongated conveyor track having a free end, said tracks being adapted for arrangement in substantial longitudinal alignment with said free ends thereof in spaced relationship presenting a gap therebetween;

an elongated track segment having spaced ends adapted for positioning in said gap in substantial longitudinal alignment with said tracks, one of the ends of the segment being moveably attached to the free end of said first track for movement between a gap closed position and a gap open position; and a safety switch mechanism effective when the segment is in its gap open position to block the free end of the second track to prevent movement of a carrier on the second track toward said gap.

2. An overhead conveyor track system as set forth in claim 1, wherein said system includes at least one overhead support assemblage for said second track, said safety switch mechanism being carried by said support assemblage.

3. An overhead conveyor track system as set forth in claim 2, wherein said support assemblage is attached to an upper structure of an elevator.

4. An overhead conveyor track system for a wheeled carrier having at least one wheel adapted for traveling along a track and a depending load bracket, said system comprising:

a first elongated conveyor track having a free end;

a second elongated conveyor track having a free end, said tracks being adapted for arrangement in substantial longitudinal alignment with said free ends thereof in spaced relationship presenting a gap therebetween;

an elongated track segment having spaced ends adapted for positioning in said gap in substantial longitudinal alignment with said tracks, one of the ends of the segment being moveably attached to the free end of said first track for movement between a gap closed position and a gap open position; and a track blocking member at said one end of the segment effective when the segment is in its gap open position to block the free end of the first track to prevent movement of a carrier on the first track toward said gap.

5. An overhead conveyor track system as set forth in claim 4, further comprising a safety switch mechanism effective when the segment is in its gap open position to block the free end of the second track to prevent movement of a carrier on the second track toward said gap.

6. An overhead conveyor track system for a wheeled carrier having at least one wheel adapted for traveling along a track and a depending load bracket, said system comprising:

a first elongated conveyor track having a free end;

a second elongated conveyor track having a free end, said tracks being adapted for arrangement in substantial longitudinal alignment with said free ends thereof in spaced relationship presenting a gap therebetween;

an elongated track segment having spaced ends adapted for positioning in said gap in substantial longitudinal alignment with said tracks, one of the ends of the segment being moveably attached to the free end of said first track for movement between a gap closed position and a gap open position;

a safety switch mechanism mounted adjacent the free end of the second track, said mechanism including a track blocking and unblocking element comprising an elongated arm that is moveable between track blocking and track clearing positions, said arm being operable in its track blocking position to prevent the movement of a carrier on the second track toward the gap, said safety switch mechanism including a latching member that is operably connected to and moves with the arm; and a latch element operably associated with the track segment and disposed when the track segment is in its gap closed position to contact the latching member and thereby prevent movement of the arm to its track blocking position.

7. A system as set forth in claim 6, wherein said system includes a track blocking member at said one end of the segment including an extension element located to block the free end of the first track when the segment is in its gap open position to prevent movement of a carrier on the first track toward said gap.

8. A system as set forth in claim 7, wherein said safety switch mechanism includes a biasing element operably connected to the arm and urging the latter toward its rail blocking position.

9. A system as set forth in claim 8, wherein said track blocking and unblocking element is pivotally mounted for swinging about a horizontal axis to move the arm between its said blocking and clearing positions.

10. A system as set forth in claim 9, wherein the safety switch mechanism includes an elongated appendage that is operably connected to the track blocking and unblocking element so that the arm and the appendage move in unison, said appendage having a latching portion that is positioned for contacting the latch element whenever the track segment is in its gap closed position and the arm is in its track clearing position, said contact between the latch element and the latching portion preventing movement of the elongated appendage and thereby movement of the arm to its track blocking position.

11. A system as set forth in claim 7, wherein said track segment is pivotally attached to the free end of the first track for swinging about a horizontal axis.

12. A system as set forth in claim 11, wherein said extension element comprises a leg mounted adjacent said one end of the track segment so as to swing into a position alongside said first track when the track element swings into its gap open position.

13. An overhead conveyor track system as set forth in claim 7, wherein said system includes at least one overhead support assemblage for said first track and at least one overhead support assemblage for said second track, said safety switch mechanism being carried by the support assemblage for the second track.

14. An overhead conveyor track system as set forth in claim 13, wherein the support assemblage for the second track is attached to an upper structure of an elevator.

15. A system as set forth in claim 6, wherein said safety switch mechanism includes a biasing element operably connected to the arm and urging the latter toward its rail blocking position.

16. A system as set forth in claim 15, wherein said track blocking and unblocking element is pivotally mounted for swinging about a horizontal axis to move the arm between its said blocking and clearing positions.

17. A system as set forth in claim 16 wherein the safety switch mechanism includes an elongated appendage that is operably connected to the track blocking and unblocking element so that the arm and the appendage move in unison, said appendage having a latching portion that is positioned for contacting the latch element whenever the track segment is in its gap closed position and the arm is in its track clearing position, said contact between the latch element and the latching portion preventing movement of the elongated appendage and thereby movement of the arm to its track blocking position.

18. An overhead conveyor track system as set forth in claim 6, wherein said system includes at least one overhead support assemblage for said second track, said safety switch mechanism being carried by said support assemblage.

19. An overhead conveyor track system as set forth in claims wherein 18, said support assemblage is attached to an upper structure of an elevator.

20. An overhead conveyor track system for a wheeled carrier having at least one wheel adapted for traveling along a track and a depending load bracket, said system comprising:

a first elongated conveyor track having a free end;
a second elongated conveyor track having a free end, said tracks being adapted for arrangement in substantial longitudinal alignment with said free ends thereof in spaced relationship presenting a gap therebetween;
an elongated track segment having spaced ends adapted for positioning in said gap in substantial longitudinal alignment with said tracks, one of the ends of the segment being moveably attached to the free end of said first track for movement between a gap closed position and a gap open position; and
a track blocking member at said one end of the segment including an extension element located to block the free end of the first track when the segment is in its gap open position to prevent movement of a carrier on the first track toward said gap.

21. A system as set forth in claim 20, wherein said track segment is pivotally attached to the free end of the first track for swinging about a horizontal axis.

22. A system as set forth in claim wherein 21, said extension element comprises a leg mounted adjacent said one end of the track segment so as to swing into a position alongside said first track when the track element swings into its gap open position.

23. An overhead conveyor track system for a wheeled carrier having at least one wheel adapted for traveling along a track and a depending load bracket, said system comprising:
a first elongated conveyor track having a free end;
a second elongated conveyor track having a free end, said tracks being adapted for arrangement in substantial longitudinal alignment with said free ends thereof in spaced relationship presenting a gap therebetween;
an elongated track segment having spaced first and second ends, said track segment being adapted for positioning in said gap in substantial longitudinal alignment with said tracks, the first end of the segment being rotatably attached to the free end of said first track for swinging movement between a horizontal gap closed position and a gap open position where the track segment depends vertically from said free end of the first track, said system including a receptacle mounted at the free end of the second track for releasably supporting the second end of the track segment when the track segment is in its gap closed position and prevent it from swinging downwardly into its gap open position;
an automatic safety switch mechanism mounted adjacent the free end of the second track, said mechanism including a track blocking and unblocking element, an elongated rocker element and an elongated pivoting beam structure, said track blocking and unblocking element being mounted for rotation about a horizontal axis that extends transversely therethrough and comprising an elongated arm that is moveable between track blocking and track clearing positions when the track blocking and unblocking element swings about said horizontal axis, said arm being operable in its track blocking position to prevent movement of a carrier on the second track toward the gap,
said rocker element having a pair of spaced ends and being rotatable about a horizontal axis that extends transversely therethrough between said spaced ends thereof and which is essentially perpendicular to the axis of rotation of the track blocking and unblocking element,
said beam structure having a pair of spaced ends and being mounted so, as to pivot about a horizontal axis that extends transversely therethrough between its said spaced ends and which is essentially parallel to the axis of rotation of the rocker element, said beam structure including a laterally extending appendage that extends toward the second end of the track segment when the track segment is in its gap closed position in essential parallelism relative to the axis of the pivoting beam structure, said appendage having a latching portion at its free end disposed adjacent the second end of the track segment when the track segment is in its gap closed position,
said track blocking and unblocking element, said rocker element and said beam structure being linked together so as to pivot about their respective axes in unison, said safety switch mechanism further comprising a spring element connected to at least one of said track blocking and unblocking element, said rocker element and said beam structure in a position to urge the arm toward its track blocking position;
a latch element comprising a latch plate extending laterally from said track segment at a location adjacent said second end thereof, said latch element being in a position when the track segment is in its gap closed position to contact the latching portion at the free end of the appendage and prevent the appendage and thereby the beam structure, the rocker element, and the track blocking and unblocking element from moving under the influence of the spring element when the track segment is in its gap closed position, whereby the arm is prevented from moving to its track blocking position; and
a track blocking member at said first end of the track segment including an extension element located to block the free end of the first track when the segment is in its gap open position to prevent movement of a carrier on the first track toward said gap, said track blocking member comprising a leg mounted at said first end of the track segment and extending outwardly away from said first end in a direction essentially parallel to the track segment so as to swing upwardly into a first track blocking position alongside said first track when the track element swings downwardly into its gap open position.

24. An overhead conveyor track system as set forth in claims 23, wherein said system includes at least one overhead support assemblage for said first track and at least one overhead support assemblage for said second track, said safety switch mechanism being carried by the support assemblage for the second track.

25. An overhead conveyor track system as set forth in claim 24, wherein the support assemblage for the second track is attached to an upper structure of an elevator.

26. An overhead conveyor track system for a wheeled carrier having at least one wheel adapted for traveling along a track and a depending load bracket, said system comprising:
a first elongated conveyor track having a free end;
a second elongated conveyor track having a free end, said tracks being adapted for arrangement in substantial longitudinal alignment with said free ends thereof in spaced relationship presenting a gap therebetween;
an elongated track segment that is adapted and arranged so as to be placed in the gap in a gap closed position in substantial longitudinal alignment with said tracks, said segment normally being in said gap in its gap closed position but being removable from said gap so as to provide the system with a gap open condition; and an automatic safety switch mechanism, including at least one moveable track blocking element that is operably coupled with the segment when the latter is in its gap closed position, and which is effective when the segment is removed from its gap closed position and the system is in its gap open condition, to block at least one of the free ends of the tracks to prevent movement of a carrier toward said gap.

27. An overhead conveyor track system as set forth in claim 26, wherein the automatic safety switch mechanism includes two moveable track blocking elements whereby both of the free ends are blocked when the system is in its gap open condition.

\* \* \* \* \*